US006871143B2

(12) United States Patent
Fujiwara (10) Patent No.: US 6,871,143 B2
(45) Date of Patent: Mar. 22, 2005

(54) NAVIGATION APPARATUS (75) Inventor: Kiyozumi Fujiwara, Yokohama (JP)

(73) Assignee: Alpine Electronics, Inc., Tokyo (JP)

( * ) Notice: Subject to any disclaimer, the term of this patent is extended or adjusted under 35 U.S.C. 154(b) by 17 days.

(21) Appl. No.: 10/446,632

(22) Filed: May 28, 2003

(65) Prior Publication Data

US 2004/0049341 A1 Mar. 11, 2004

(30) Foreign Application Priority Data

May 30, 2002 (JP) ........................................ 2002-158375

(51) Int. Cl.$^7$ ............................................ G01C 21/30
(52) U.S. Cl. .................... 701/211; 340/995.24
(58) Field of Search ................................ 701/201, 209, 701/210, 211; 340/995.14, 995.15, 995.19, 995.2, 995.24, 995.27; 342/357.13

(56) References Cited

U.S. PATENT DOCUMENTS

| 6,169,552 | B1 | * | 1/2001 | Endo et al. ................. 345/427 |
| 6,285,317 | B1 | | 9/2001 | Ong |
| 6,356,840 | B2 | * | 3/2002 | Kusama ...................... 701/211 |
| 6,360,168 | B1 | * | 3/2002 | Shimabara .................. 701/211 |
| 6,710,774 | B1 | * | 3/2004 | Kawasaki et al. .......... 345/419 |
| 2002/0063705 | A1 | * | 5/2002 | Moriwaki et al. .......... 345/422 |

FOREIGN PATENT DOCUMENTS

EP          0803706 A2 * 10/1997

* cited by examiner

Primary Examiner—Michael J. Zanelli
(74) Attorney, Agent, or Firm—Brinks Hofer Gilson & Lione (57) ABSTRACT A navigation route obstructed-by-building detection unit detects that a navigation route is obstructed by buildings, and a modified navigation route drawing unit in a navigation route drawing unit displays the navigation route by lifting it on or above the buildings. At the time, a ratio of obstructed portion calculating unit calculates the ratio of the portion of the navigation route obstructed by the buildings, and a display of navigation route in lifted state discriminating unit determines whether or not the ratio is equal to or larger than a predetermined value. When the ratio is equal to or larger than the predetermined value, an amount of navigation route displayed in lifted state calculating unit calculates a lifting amount, and a modified navigation route drawing unit displays the navigation route by lifting it by the lifting amount. Thereafter, a building/landmark image forming unit semi-transparently draws the portion of the buildings corresponding to the portion of the navigation route that is lifted and displayed. With the above arrangement, a user can easily observe the navigation route which is otherwise poor in observability.

12 Claims, 6 Drawing Sheets

NAVIGATION APPARATUS

BACKGROUND OF THE INVENTION

1. Field of the Invention

The present invention relates to a navigation apparatus for guiding a vehicle to a destination, and more particularly, to a navigation apparatus for preventing difficulty in viewing a navigation route when the navigation route is shown in a map displayed on a screen and is obstructed by buildings and the like that are three-dimensionally displayed on the screen.

2. Description of the Related Art

A navigation apparatus includes a map/information storage medium such as a CD-ROM, DVD-ROM, and the like in which map data for drawing a map and facility information data for searching facilities and the like are recorded, a replay unit for reading data from the map/information storage medium, a display unit for displaying a map and the like, and a vehicle position detecting unit for detecting a present position and a traveling direction of a vehicle using an integrated navigating system such as a distance sensor, gyro and the like and a GPS receiver and the like. The navigation apparatus reads out map data around the present position of the vehicle from the map/information storage medium, draws a map image of the vicinity of the vehicle position based on the map data on a screen of the display unit, displays a vehicle position mark by superimposing it on the display screen, and scrolls the displayed map image as the vehicle moves or moves the vehicle position mark while fixing the map image on the screen so that the present vehicle location can be found instantly.

The map data stored in the map/information storage medium such as the CD-ROM, DVD-ROM and the like is separated into longitude sections and latitude sections each having a proper width according to various levels of reduction scale. Roads and the like are stored as sets of coordinates of nodes expressed by longitudes and latitudes. A road is composed of at least two nodes connected to each other, and the map data is composed of a road layer, which includes a road list, a node table, an intersection constituting node list and the like, map data such as a background layer and the like for displaying roads, buildings, facilities, parks, rivers, and the like on a map screen, and information data for displaying characters, map symbols and the like of the names of administrative districts such as the names of local authorities, the names of roads, intersections, facilities, and the like.

An image combining unit appropriately combines the above data, displays a map, and three-dimensionally displays, for example, landmarks indicating characteristic buildings, surrounding buildings, and facilities as necessary so that the situation of a present position can be easily understood on a map. Further, a user can drive the vehicle while easily ascertaining a present vehicle position by comparing the surrounding situation that the user observes with an image displayed on a monitor screen. In particular, with improved processing speed and advanced image display technology, satisfactory three-dimensional images of buildings on a map have been achieved in recent navigation apparatuses, and many navigation apparatuses are used to display surrounding buildings three-dimensionally while displaying a map as if from a bird's-eye view.

Further, the navigation apparatus has a route guiding function for enabling the user to easily drive the vehicle to a desired destination without traveling on a wrong road. According to the route guiding function, a destination and waypoint locations are set by various means using an address, phone number, scrolling of a map, landmark nearby, and the like, and a proper route is calculated and presented by adding various conditions to routes connecting these locations from a start point to the destination. A route selected by the user is stored as a navigation route and displayed on the screen by being drawn using a thick line with a color different from that of other routes while the vehicle travels. Further, when the vehicle comes near to an intersection within a predetermined distance where it must change a course on the navigation route, the intersection is displayed in enlargement, an arrow or the like which indicates a direction in which the course of the vehicle must be changed is drawn and displayed on the screen, and voice guidance for guiding right and left turns is supplied to the user so as to guide the user to the destination.

When the navigation route as described above is calculated, there are available various kinds of route calculation systems that calculate, for example, a route through which the user can reach the destination from the present position in a shortest time, a route having a shortest traveling distance, a route making use or not making use of a highway and other toll roads, and so on. Of these route calculation systems, when there is a route calculation system designated by the user through a menu screen, the navigation apparatus presents an optimum route calculated by the designated calculation system to the user. Further, when no calculation system is designated by the user first, the navigation apparatus may display the routes calculated by the respective calculation systems on the screen with a different color, and the user selects and determines a desired route therefrom.

In the navigation apparatus arranged as described above, the navigation route calculated and determined as described above is displayed by being superimposed on a road of a map displayed on the monitor screen. At this time, when the displayed map is a two-dimensional map, the user can observe the navigation route as it is. As a result, the user can easily and distinctly observe an area ranging from a present position of the vehicle to a location existing in a traveling direction.

Figure 6:
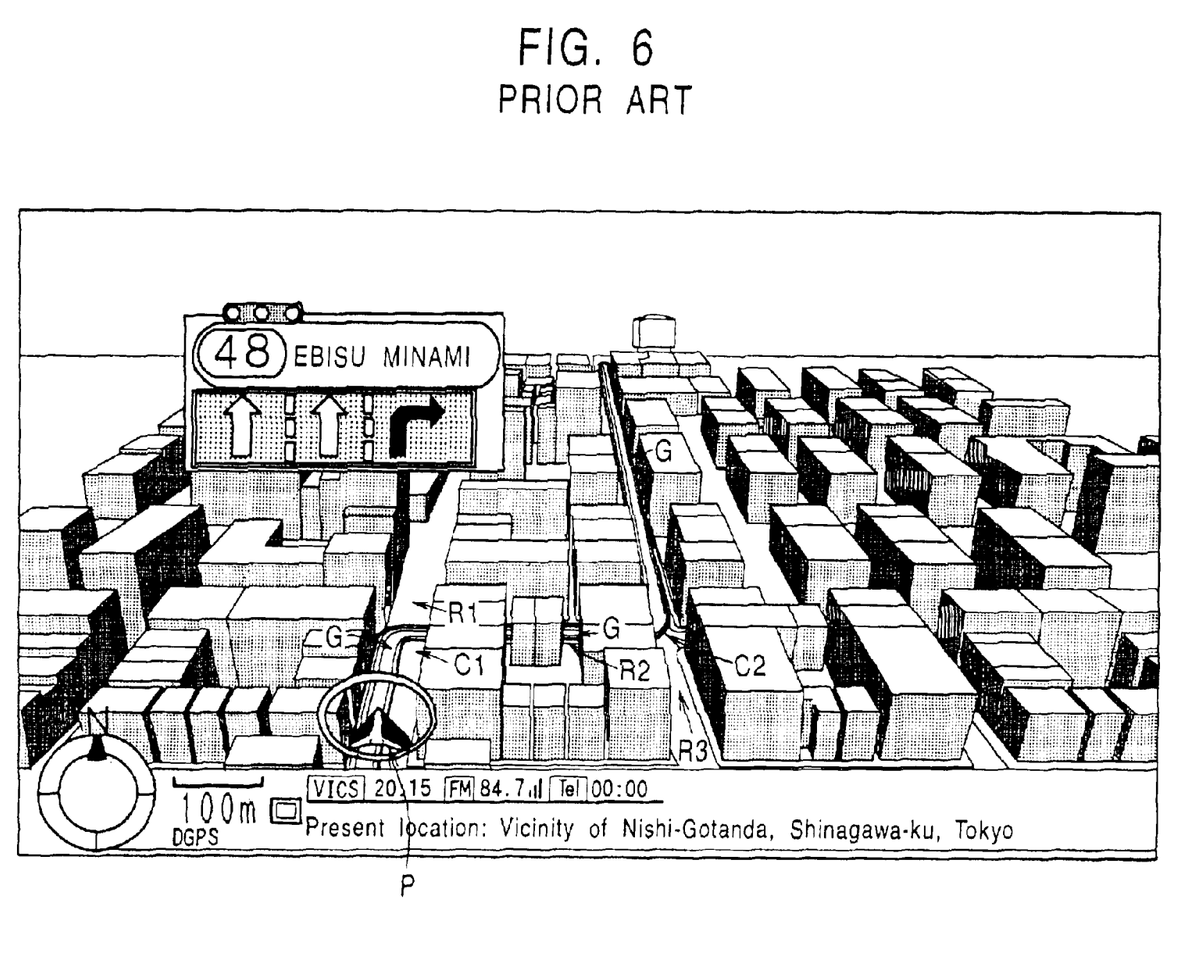
FIG. 6 is a display example displayed on a monitor screen of a conventional navigation apparatus.

However, in recent years, many navigation apparatuses have been used to display a map as if from a bird's-eye view, and surrounding buildings are displayed substantially opaquely and three-dimensionally. Accordingly, when for example as shown in FIG. 6, a navigation route G extends forward on a road R1 from a vehicle position mark P, makes a right turn at an intersection C1 displayed as EBISU MINAMI INTERSECTION in the figure, travels straight on a road R2, makes a left turn at a next intersection C2, and travels straight on a road R3 on a map in which buildings are three-dimensionally displayed, the road R2 cannot be observed because it is obstructed by buildings in front of it. Thus, a problem arises that the navigation route G displayed on the road R2 almost cannot be observed.

As a countermeasure to the above problem, there is a system for three dimensionally displaying buildings and the like on a map using transparent frames and properly color coding them so that a road and a navigation route displayed thereon can be observed. In this display method, however, when the buildings are displayed transparently so that the navigation route and the like can be distinctly observed, the appearance of the buildings purposely displayed three-dimensionally is difficult to see, and thus displaying buildings three-dimensionally becomes meaningless. On the other hand, displaying the buildings so that the appearance thereof can be distinctly observed makes it difficult to observe the road and the navigation route. That is, a distinct display of buildings is incompatible with that of a road and a navigation route, and it is substantially impossible to coordinate the distinct display of the appearance of the buildings with that of the navigation route.

SUMMARY OF THE INVENTION

Accordingly, an object of the present invention is to provide a navigation apparatus that enables a navigation route, which is obstructed by buildings, on a road to be distinctly observed even if the buildings are substantially opaquely and three-dimensionally displayed on a map.

To solve the above problems, the navigation apparatus according to the present invention includes an image forming means for substantially opaquely and three-dimensionally displaying buildings on a map and displaying a navigation route on a road, a navigation route obstructed-by-building detection means for detecting a portion of the navigation route that is obstructed by the buildings displayed three-dimensionally, and a modified navigation route drawing means for lifting the portion of the navigation route obstructed by the buildings on or above the buildings and displaying the portion of the navigation route.

In another navigation apparatus according to the present invention, the image forming means in the navigation apparatus subjects the buildings corresponding to the portion of the navigation route displayed by being lifted to transparent or semi-transparent display processing so that the buildings can be distinguished from other buildings.

In another navigation apparatus according to the present invention, when a building by which the portion of the navigation route is hidden is as tall as or taller than a predetermined height, the image forming means in the navigation apparatus transparently displays the building or does not display the building.

In another navigation apparatus according to the present invention, when the ratio of the portion of the navigation route obstructed by the three-dimensionally displayed buildings is equal to or larger than a predetermined ratio in a specific section of the navigation route, the modified navigation route drawing means in the navigation apparatus executes the processing for lifting and displaying the navigation route.

Further, in another navigation apparatus according to the present invention, when the navigation route is hidden by a building that is as tall as or taller than a predetermined height, the modified navigation route drawing means in the navigation apparatus lifts the navigation route and displays it on or above buildings other than the above building.

BRIEF DESCRIPTION OF THE DRAWINGS

FIGS. 5A and 5B are views partly in enlargement showing examples of various display modes displayed on the monitor screen of the navigation apparatus according to the present invention, wherein FIG. 5A is a view partly in enlargement of a display example of FIG. 4.

DESCRIPTION OF THE PREFERRED EMBODIMENTS

Figure 1:
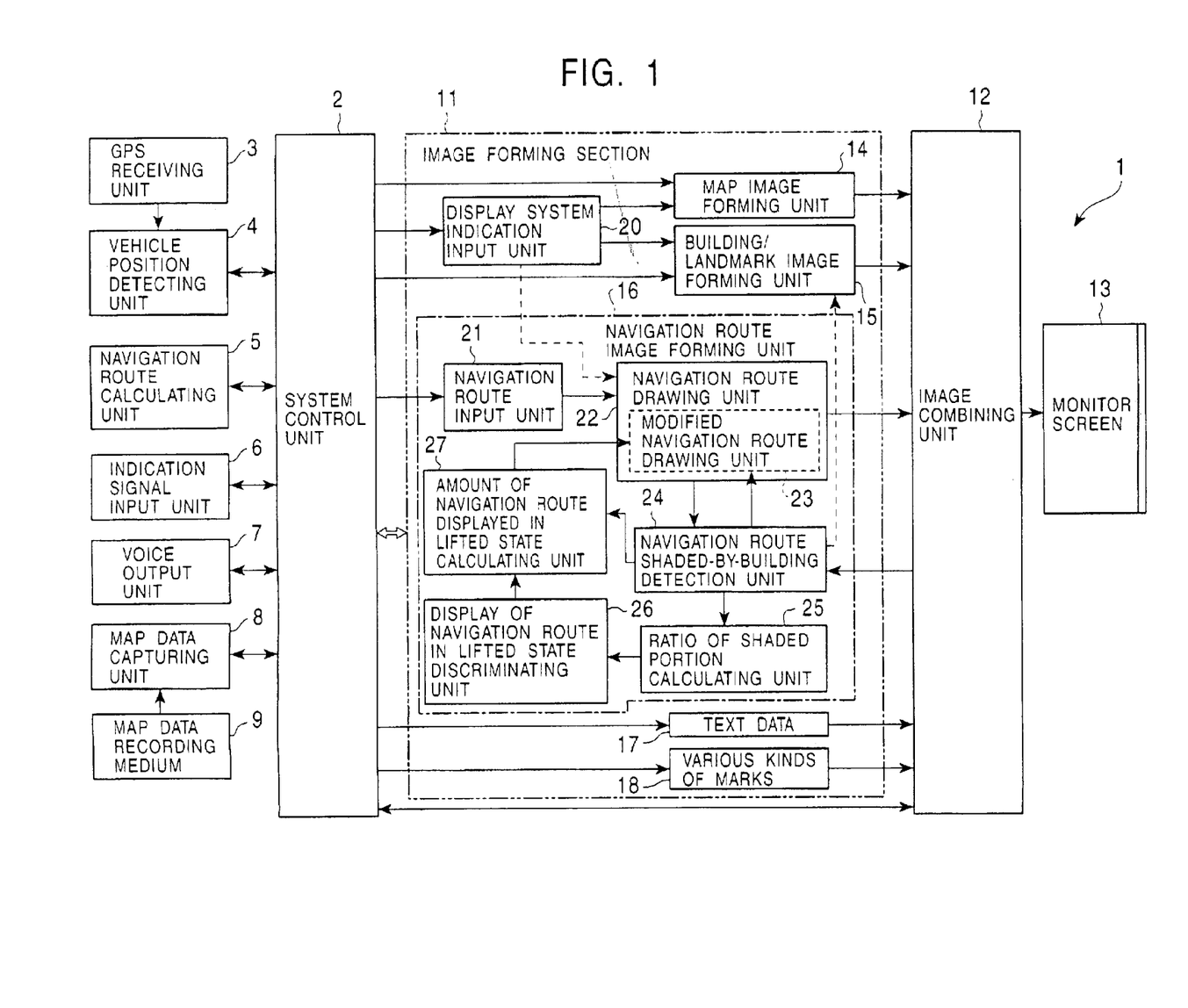
FIG. 1 is a functional block diagram of an embodiment of the present invention.

An embodiment of the present invention will be described with reference to the drawings. FIG. 1 is a functional block diagram showing the interrelationship among the main functional units in a navigation apparatus of the present invention, wherein an image forming section 11, which includes a navigation route image forming unit 16 according to the present invention described later, is associated with the operation of other functional units through a system control unit 2 and executes a predetermined operation based on software. A vehicle position detecting unit 4 is connected to the system control unit 2 and detects a present position of a vehicle by being supplied with position data from a GPS receiving unit 3 and further supplied with vehicle movement data and the like from a vehicle speed sensor and an angle sensor when necessary.

A navigation route calculating unit 5 determines a navigation route from the present position to a destination or a navigation route to the destination, via a waypoint location selected and indicated by a user, when necessary from data recorded in a map data recording medium 9 through a map data capturing unit 8 in response to a destination selection/indication signal input by the user through an indication signal input unit 6. Then, the navigation route calculating unit 5 calculates a route recommended by the navigation apparatus, using a priority or non-priority route of a highway, a shortest distance route, a shortest necessary time route, and the like.

The user enters indication signals necessary for the navigation apparatus to the indication signal input unit 6, in addition to the destination selection/indication signal described above. When necessary, the user enters indication signals by voice, having been subjected to voice recognition processing. A voice output unit 7 can generate various voice notifications to the user through a speaker to guide, for example, a navigation route and the like, the voice notifications being obtained from various processing units of the navigation apparatus. The map data capturing unit 8 captures the necessary map data, facility information, and the like from the map data recording medium 9, such as a DVD-ROM, CD-ROM, and the like, and draws a map and displays information based on the map data and the like.

Various kinds of image data formed by the image forming section 11 are appropriately combined with each other by an image combining unit 12 that operates in response to an indication from the system control unit 2, and the combined image data is displayed on a monitor screen 13. In an illustrated example, maps and facility information of buildings, landmarks, and the like are recorded in the map data recording medium 9 and captured through the map data capturing unit 8 as in conventional navigation apparatuses, and a map image forming unit 14 forms a predetermined map image in response to a map display indication employing a bird's-eye view system that is indicated by the user through a display system indication input unit 20. Further, a building/landmark image forming unit 15 can three-dimensionally display buildings, landmarks, and the like that are displayed in relation to the above map in response to an indication of the user for displaying the buildings and the like three-dimensionally.

In the illustrated example, the navigation route image forming unit 16 is supplied with navigation route data calculated by the navigation route calculating unit 5 through a navigation route input unit 21 and forms an image of a navigation route, which is displayed on a road of a map image as described above, through a navigation route drawing unit 22. The image combining unit 12 is also supplied with text data 17 such as character information and the like and with various kinds of marks 18 of gas stations, restaurants, signals and the like so as to combine the images for displaying a map and information.

The navigation route image forming unit 16 is supplied with the navigation route data calculated by the navigation route calculating unit 5 as described above through the navigation route input unit 21, and the navigation route drawing unit 22 draws a navigation route so that it corresponds to road data entered separately. At this time, when the user enters information to three-dimensionally display buildings and the like through the display system indication input unit 20, a signal of the information is supplied to the navigation route drawing unit 22, whereby the navigation route drawing unit 22 starts the operation of a navigation route obstructed-by-building detection unit 24. In response to the signal, the navigation route obstructed-by-building detection unit 24 detects a portion of the navigation route which is obstructed by buildings in the image combined by the image combining unit 12.

The data detected by the navigation route obstructed-by-building detection unit 24 is supplied to a ratio of obstructed portion calculating unit 25 for calculating the ratio of the portion of the navigation route obstructed by the building in a specific range of the navigation route. The data obtained as a result of calculation executed by the ratio of obstructed portion calculating unit 25 is supplied to a display of navigation route in lifted state discriminating unit 26. The display of navigation route in lifted state discriminating unit 26 discriminates whether or not the ratio of the portion of the navigation route obstructed by the buildings is equal to or larger than a predetermined ratio to thereby discriminate whether or not the navigation route is to be displayed after it is lifted.

When the display of navigation route in lifted state discriminating unit 26 determines that the navigation route must be lifted and displayed, the discriminating unit 26 supplies a signal of the determination to an amount of navigation route displayed in lifted state calculating unit 27. The amount of navigation route displayed in lifted state calculating unit 27 calculates the height of the buildings which hide the navigation route in the portion obstructed by the buildings that is detected by the navigation route obstructed-by-building detection unit 24 and further calculates a height by adding a proper amount of height to the above calculated height, the height being used as a lifting amount of the navigation route to be displayed.

The result of calculation is supplied to a modified navigation route drawing unit 23 in the navigation route drawing unit 22. The modified navigation route drawing unit 23 executes drawing processing for modifying the navigation route so that the portion, which is obstructed by the buildings, of the navigation route detected by the navigation route obstructed-by-building detection unit 24 is lifted and displayed by the amount calculated by the amount of navigation route displayed in lifted state calculating unit 27 with respect to the navigation route previously drawn by the navigation route drawing unit 22 in an ordinary mode. With the function arranged as described above, the navigation route can be displayed in a state in which it is not obstructed by the buildings.

Figure 2:
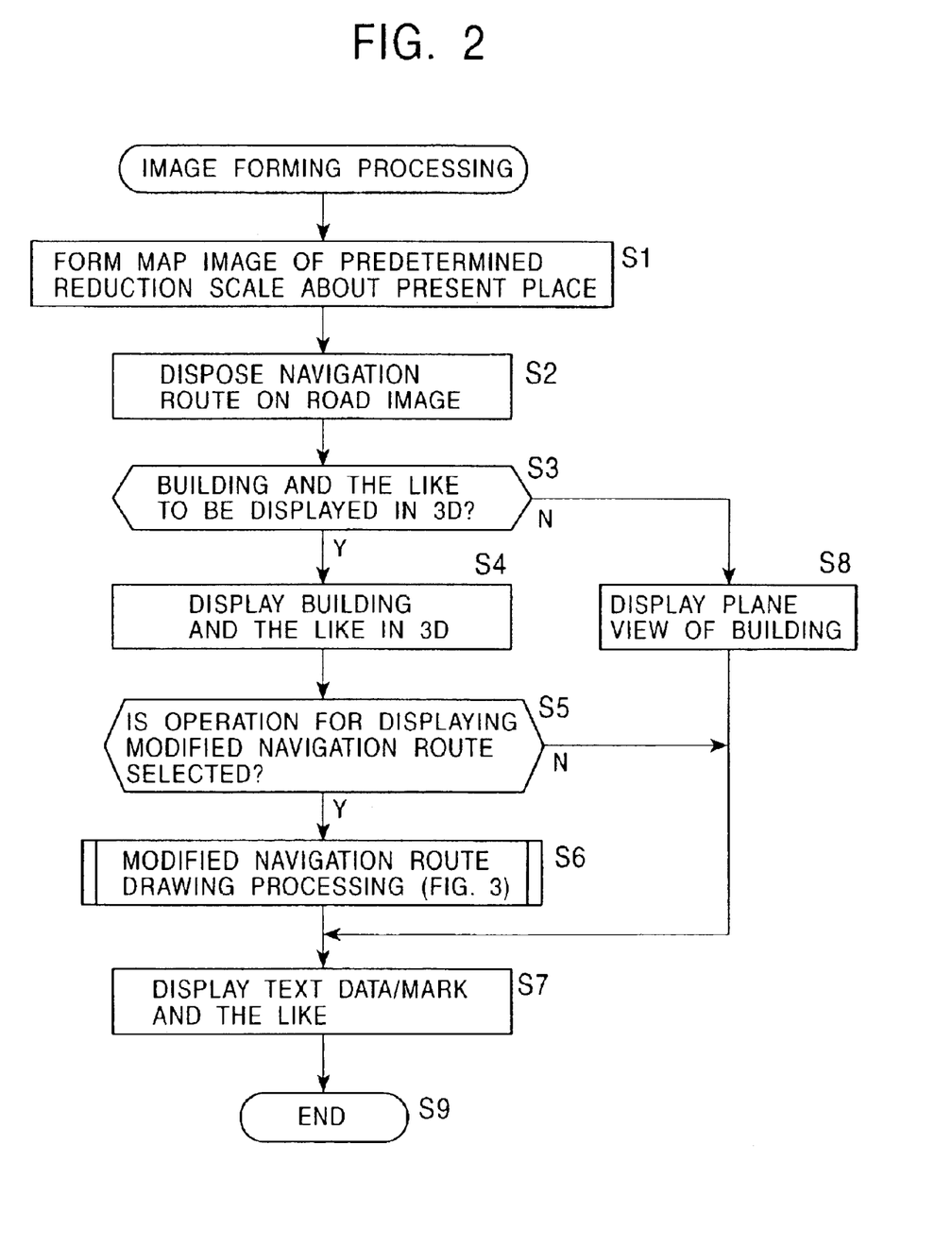
FIG. 2 is an operation flowchart of image forming processing in the embodiment.
Figure 3:
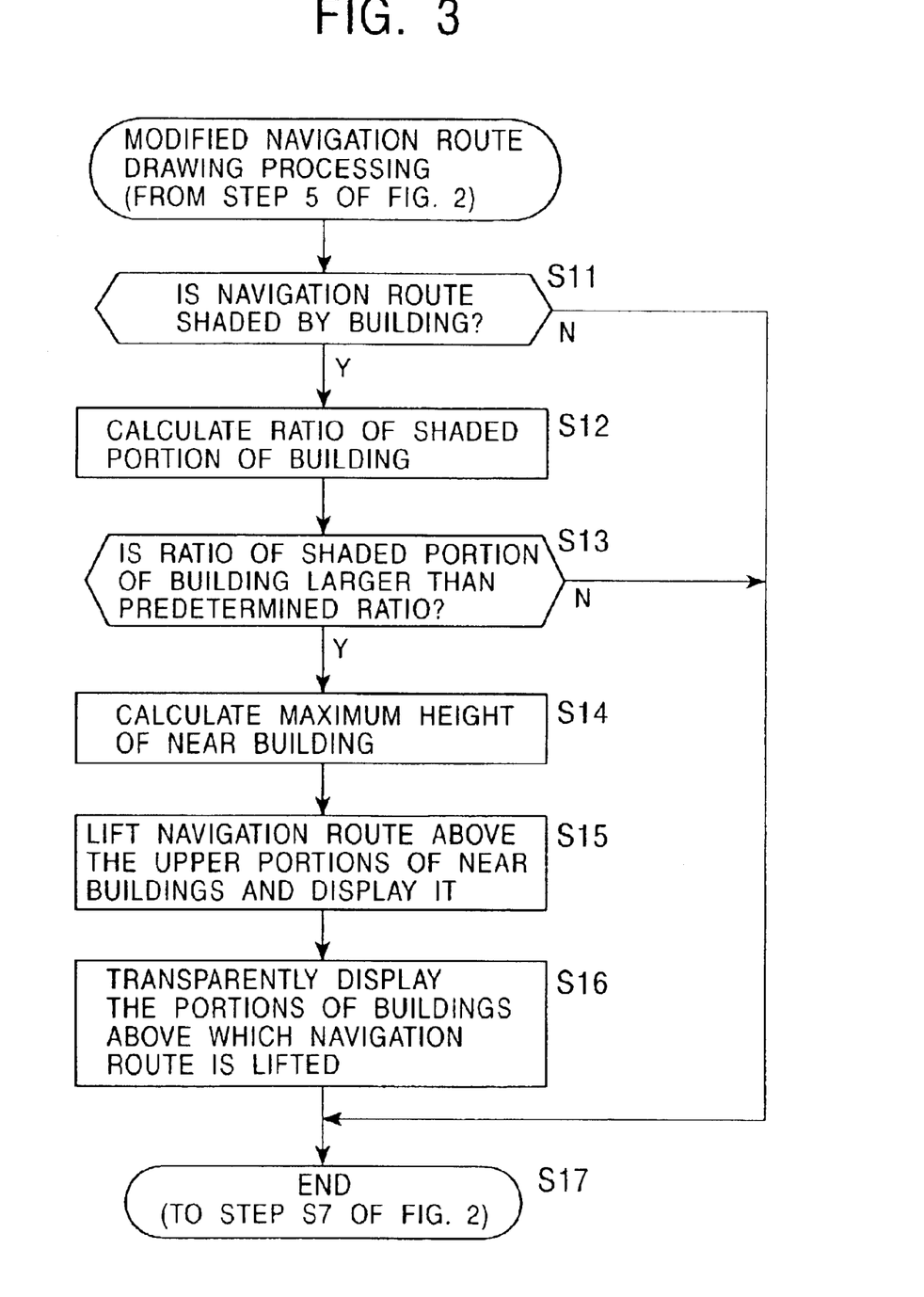
FIG. 3 is an operation flowchart of a portion of modified navigation route drawing processing in the operation flowchart of the image forming processing.

The navigation apparatus comprising the above functional blocks can display a predetermined image on the monitor screen 13 by forming various kinds of images by operation flows shown in, for example, FIGS. 2 and 3 that show a part of the processing of FIG. 2 and by supplying the images to the image combining unit 12. The operation flows will be explained with reference to the functional block diagram of FIG. 1 and the display examples in FIGS. 4 and 5.

In the image creation processing, first, an image of a map surrounding a present position is formed on a predetermined reduction scale (step S1). That is, the map image forming unit 14 designates a position of a vehicle detected by the vehicle position detecting unit 4 as the present position based on the map data captured from the map data capturing unit 8 and displays a predetermined map based on a displayed map reduction scale indication signal entered by the user through the indication signal input unit 6 or based on a preset reduction scale unless the reduction scale indication signal is specifically entered. At this time, when the display system indication input unit 20 detects that the user indicates display of the map by, for example, the bird's eye view system, the map image is formed so as to display the map corresponding to the indication.

Next, a navigation route is disposed on a road image of the map (step S2). The navigation route is an image formed by the navigation route drawing unit 22 based on data before navigation route modification processing, which will be described later, is executed, and the image is superimposed on the road image by the image combining unit 12.

Thereafter, it is determined whether or not buildings and the like are to be three-dimensionally displayed (step S3). In this determination, the display system indication input unit 20 determines whether or not the user indicates the three-dimensionally display of buildings, landmarks, and the like on the map image. Further, even if the user does make such an indication, when it is determined that a three-dimensional display is to be executed under a particular condition, it is determined whether or not the condition is satisfied at present.

When it is found that the buildings must be three-dimensionally displayed as the result of this determination, the buildings, landmarks, and the like are three-dimensionally displayed on the map image (step S4). In the embodiment of FIG. 1, this display processing is executed such that three-dimensional images of buildings and the like from the building/landmark image forming unit 15 are combined with and displayed on an upper layer of the above image at a predetermined position on a map on which images are combined by disposing the navigation route on a road by the image combining unit 12 as described above. Note that the image formed at this time is similar to an example of an image shown in FIG. 6 which is formed by a conventional navigation apparatus.

Thereafter, it is determined whether or not a mode for displaying the navigation route after it is modified is selected (step S5). This determination can be made by detecting whether or not, for example, the user of the navigation apparatus previously selected an operation for displaying the navigation route in the modified mode when the user set the operation of the navigation apparatus. Note that even if the navigation apparatus is previously set not to use a function for selecting the operation for displaying a navigation route in the modified mode, it is possible to change the above setting by entering a particular voice instruction or operating a particular key while the vehicle travels so that the navigation route can be displayed after it is modified.

When it is determined at step S5 that the navigation route modification/display operation is selected, the modified navigation route drawing processing shown in FIG. 3 is executed as described later. Thereafter, text data, marks and the like are superimposed on the image and displayed (step S7) and the image forming processing in the operation flows is finished (step S9).

When it is determined at step S3 that the buildings and the like are not to be three-dimensionally displayed, the process goes to step S8 at which processing is executed to display the buildings two-dimensionally as displayed conventionally. Thereafter, the text data, marks and the like are displayed (step S7), and the processing is finished (step S9). Further, when it is determined at step S5 that the navigation route modification/display operation is not selected, it is not necessary to execute the modified navigation route drawing processing at step S6. Thus, the process goes to step S7 at which the text data, marks, and the like are displayed, and the processing is finished (step S9).

As shown in FIG. 3, the modified navigation route drawing processing at step S6 described above is initiated at step S5 of FIG. 2, and it is determined first whether or not the navigation route is obstructed by the buildings (step S11). In the example of FIG. 1, this determination can be made by the navigation route obstructed-by-building detection unit 24 determining whether or not the image of the navigation route displayed previously is obstructed by three-dimensional images of the buildings and the like in the image having been subjected to the image combination processing by the image combining unit 12 described above.

Even if it is detected as the result of the determination at step S11 that a part of the navigation route is obstructed by the buildings and the like displayed three-dimensionally, when the portion of the navigation route obstructed by the buildings and the like is small with respect to the entire navigation route, it is not necessary to execute special processing for modifying the navigation route. Thus, the ratio of the portion of the navigation route obstructed by the buildings is calculated in the illustrated embodiment to find the ratio of the portion of the navigation route obstructed by the buildings and the like to the entire navigation route (step S12). This calculation is executed in FIG. 1 by the ratio of obstructed portion calculating unit 25 using the data detected by the navigation route obstructed-by-building detection unit 24.

In the calculation of the ratio of the portion obstructed by the buildings, it is possible to regard, in, for example, the conventional image shown in FIG. 6, the portion of a navigation route G between intersections C1 and C2 as being obstructed by the buildings in front of the portion and to regard the other portion of the navigation route G as not being obstructed thereby. When the buildings shown in FIG. 6 are three-dimensionally displayed, a possibility that the displayed navigation route is obstructed by the three-dimensionally displayed buildings is large in the portion of the navigation route extending in a lateral direction and small in the portion thereof extending in a longitudinal direction at the center of a screen. Accordingly, the above calculation can be more effectively executed by taking the characteristics of an image displayed on the screen into consideration.

Further, when the ratio of a portion obstructed by buildings as described above is calculated, a navigation route is appropriately divided into several sections in consideration of the characteristics of an image as shown above. In, for example, the example shown in FIG. 6, the navigation route G is divided into three sections, that is, a section between a present position to the intersection C1, a section between the intersections C1 and C2, and a section forward of the intersection C2. Of these three sections, the calculation is executed as to the section between the intersections C1 and C2, and the ratio of the portion obstructed by the buildings is calculated using the portion in this section.

Next, it is determined whether or not the ratio of the portion obstructed by the buildings is equal to or larger than the predetermined ratio as the result of the calculation executed at step S12 (step S13). A ratio, for example, 50% is set as the predetermined ratio, and when the ratio of the portion obstructed by the buildings is equal to or larger than the predetermined ratio, processing for lifting the navigation route and then displaying it described below will be executed. Accordingly, the above processing is to determine whether or not the navigation route is to be lifted and displayed. This determination is executed by the display of navigation route in lifted state discriminating unit 26 in FIG. 1.

When it is determined at step S13 that the ratio of the portion obstructed by the buildings is larger than the predetermined ratio, a maximum height of the buildings interrupting the display of the navigation route at present is calculated (step S14) to lift the navigation route on or above the buildings which interrupt the display of the navigation route and to display it thereon or thereabove. Next, the navigation route is lifted on or above the buildings in front of it by adding a predetermined height to the maximum height based on the result of calculation and displayed thereon or thereabove (step S15). Thereafter, the buildings corresponding to the lifted portion of the navigation route are transparently displayed (step S16) to indicate that the navigation route is displayed in the lifted state and to easily convey the relationship between the lifted portion of the navigation route and a road.

Figure 4:
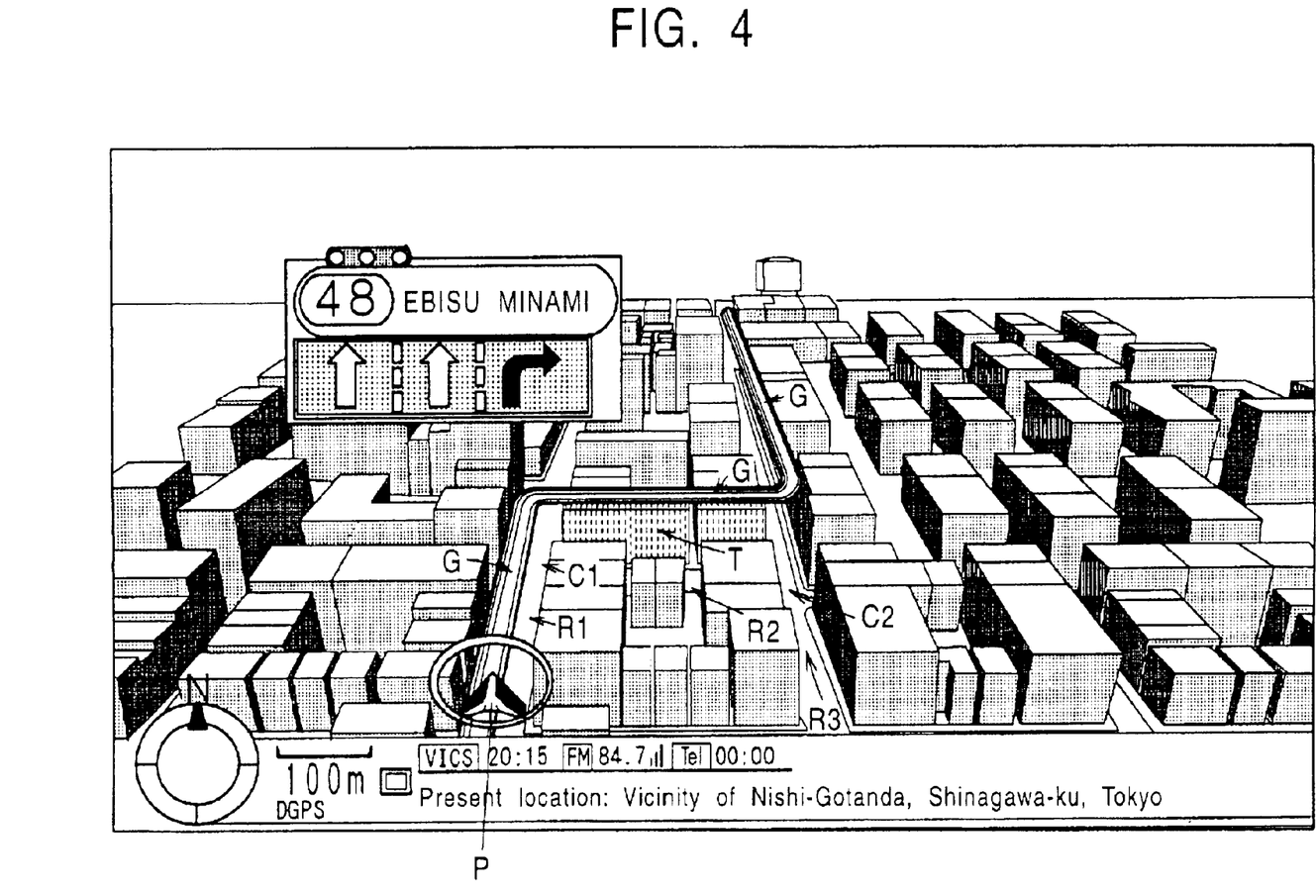
FIG. 4 is a view showing a display example displayed on a monitor screen of a navigation apparatus in the embodiment.

FIG. 4 shows an example of the displayed state, wherein a screen shows an example of a map image similar to that of the conventional example shown in FIG. 6. The map image shows an example of a navigation route G which extends straight on a road R1 from a present position P of a vehicle, makes a right turn at an intersection C1 shown as EBISU MINAMI INTERSECTION, continues straight on a road R2, makes a left turn at an intersection C2, and continues straight on a road R3.

On the screen, when the navigation route G is drawn on the respective roads, the navigation route G on the road R2 between the intersections C1 and C2 is hidden by the buildings in front of it as shown in FIG. 6 and almost cannot be seen. In contrast, in the example of the present invention shown in FIG. 4, it is possible to distinctly display the navigation route as shown in FIG. 4 by executing the processing as shown in the above operation flow. That is, it is determined at step S11 in the modified navigation route drawing processing in FIG. 3 whether or not the navigation route is obstructed by the buildings, and the ratio of the portion of the navigation route obstructed by the buildings is calculated at the next step S12. In the illustrated example, it is calculated that about 70% of the navigation route is obstructed by the buildings in the above section.

As a result, it is determined at step S13 that the ratio of the portion of the navigation route G obstructed by the buildings is equal to or larger than 50% as the predetermined ratio between the intersections C1 and C2 on the road R2, the maximum height of the buildings located in front of the portion of the navigation route is calculated at step S14, and the navigation route is lifted to a height equal to or higher than the calculated height and then displayed at step S15, whereby the navigation route is displayed in a state in which it is on or above the buildings in front of it.

Figure 5A:
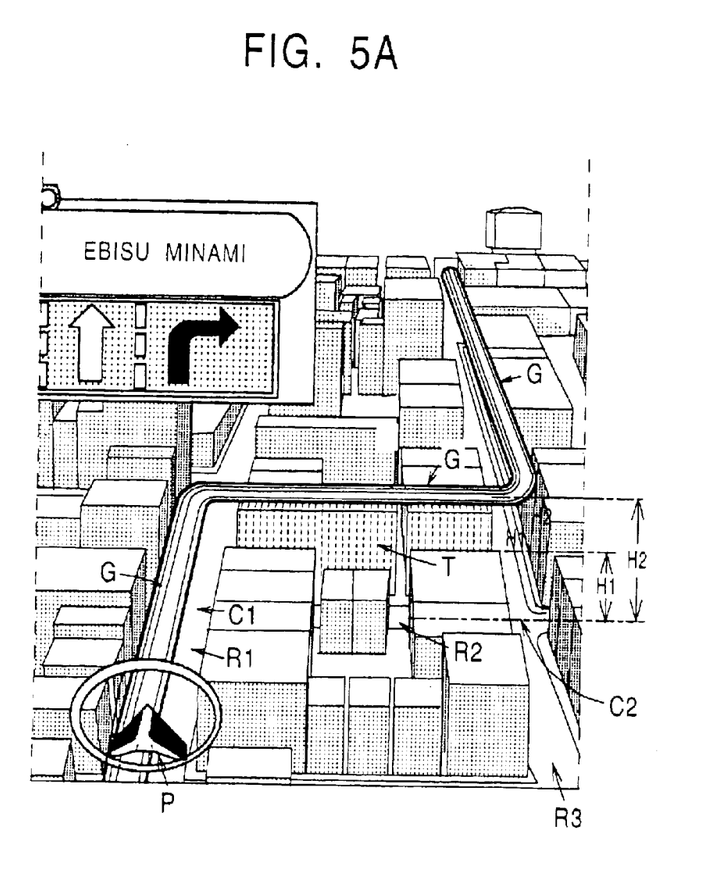

After the processing for lifting the navigation route has been executed, the buildings corresponding to the lifted portion of the navigation route are displayed in a semi-transparent state T with a color different from that of the other buildings to distinctly indicate that the navigation route is displayed different than a display of an ordinary navigation route by being lifted from a road portion therebelow. As shown in FIG. 5A showing the navigation route in enlargement, in this embodiment, the navigation route is displayed by being lifted from the road R2 to a position having a height H2 which is sufficiently higher than the maximum height H1 of the buildings in front of the navigation route so that the navigation route G in front of and behind the lifted navigation route G can be smoothly connected thereto.

Figure 5B:
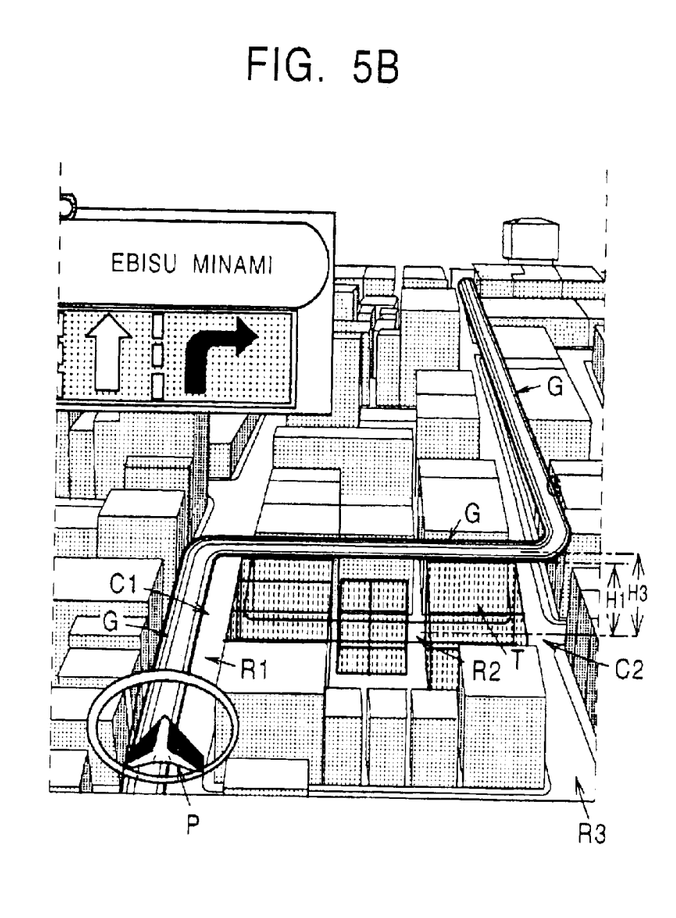
FIG. 5B is a view partly in enlargement of another display example.

As shown in, for example, in FIG. 5B, in addition to the example described above, when the navigation route is displayed by being modified to the lifted state, it may be displayed at a position having a height H3 from the road which is just above the height H1 of the buildings located in front of the navigation route G on the road R2 in a range from the intersection C1 to the intersection C2. At the same time, semi-transparent processing for indicating that the navigation route is displayed in the lifted state may be applied to the buildings located in front of the navigation route displayed in the lifted state, and the actual road R2 may be semi-transparently displayed to distinctly show the relationship between the road and the navigation route G displayed in the lifted state.

The present invention can execute the modified display processing of the navigation route in various modes other than that of the above embodiment. When, for example, a very tall building exists in the buildings obstructing a navigation route on a road, it is preferable not to display the navigation route by lifting it in the manner described above. Thus, a step for determining whether or not a building and the like in front of the navigation route is as tall as or taller than a predetermined height, or determining whether or not the number of floors of a building and the like is equal to or larger than a predetermined number of floors, may be added to the above operation flow so that the modification processing of the navigation route as described above is not executed when they are as tall as or taller than the predetermined height. Further, when a particularly tall building exists as in the above case, the navigation route may be displayed on or above the buildings other than the particularly tall building, and the particularly tall building may be transparently displayed. Further, the particularly tall building may not be displayed when necessary.

Further, the present invention can be applied to a case in which all buildings to be three-dimensionally displayed are displayed semi-transparently, in addition to a case in which a navigation route is subjected to the modification processing when buildings to be three-dimensionally displayed are displayed entirely opaquely. In this case, the portion of the buildings where the navigation route is subjected to the lifting processing is displayed in a degree of transparency higher than that of surrounding buildings in order to indicate that these buildings correspond to the portion of the navigation route subjected to the lifting processing, as well as to more distinctly show the relationship of the navigation route to the road. Note that when the buildings are displayed in the high degree of transparency, the buildings may be displayed only by frames or may not be displayed at all. Also in this case, buildings for which the number of floors is larger than the predetermined number of floors may be displayed in a mode similar to that described above.

As described above, the navigation apparatus according to the present invention includes an image forming means for substantially opaquely and three-dimensionally displaying buildings on a map and displaying a navigation route on a road, a navigation route obstructed-by-building detection means for detecting a portion of the navigation route obstructed by the buildings displayed three-dimensionally, and a modified navigation route drawing means for lifting the portion of the navigation route obstructed by the buildings on or above the buildings and displaying the portion of the navigation route. Accordingly, it is possible to distinctly observe the portion of the navigation route hidden by the buildings even in a state in which the buildings are substantially opaquely and three-dimensionally displayed on the map.

In another navigation apparatus according to the present invention, the image forming means in the navigation apparatus subjects the buildings corresponding to the portion of the navigation route displayed by being lifted to transparent or semi-transparent display processing so that the buildings can be distinguished from other buildings. Accordingly, the user can easily grasp that the navigation route is displayed in the lifted state as well as the lifted amount of the navigation route. Further, the user can easily find the relationship between the navigation route displayed in the lifted mode and an intrinsic road.

In another navigation apparatus according to the present invention, when a building by which the portion of the navigation route is hidden is as tall as or taller than a predetermined height, the image forming means in the navigation apparatus transparently displays the building or does not display the building. Accordingly, the displayed building after the navigation route is displayed in the lifted mode is not unpleasant to the eye, thereby the user can easily grasp the surroundings.

In another navigation apparatus according to the present invention, when the ratio of the portion of the navigation route obstructed by the three-dimensionally displayed buildings is equal to or larger than a predetermined ratio in a specific section of the navigation route, the modified navigation route drawing means in the navigation apparatus executes the processing for lifting and displaying the navigation route. Accordingly, there can be prevented a disadvantage in that the navigation route becomes poor in observability because the navigation route is subjected to the lifting/displaying processing even when it is only slightly obstructed by buildings in front of it and observation of it is not so difficult.

Further, in another navigation apparatus according to the present invention, when the navigation route is hidden by a building that is as tall as or taller than a predetermined height, the modified navigation route drawing means in the navigation apparatus lifts the navigation route and displays it on or above buildings other than the above building. Accordingly, there can be prevented a disadvantage in that when a building by which the navigation route is obstructed is very tall, displaying the navigation route on or above the building makes it all the more difficult to observe the navigation route.

What is a claimed is:

1. A navigation apparatus comprising:
 a building/landmark image forming unit for substantially opaquely and three-dimensionally displaying buildings on a map;

a navigation route drawing unit for displaying a navigation route on a road;

a navigation route obstructed-by-building detection unit for detecting a portion of the navigation route obstructed by the buildings displayed three-dimensionally; and a modified navigation route drawing unit for lifting the portion of the navigation route obstructed by the buildings on or above the obstructing buildings and displaying the portion of the navigation route.

2. A navigation apparatus according to claim 1, wherein the building/landmark image forming unit subjects the obstructing buildings to transparent or semi-transparent display processing so that the buildings can be distinguished from other buildings.

3. A navigation apparatus according to claim 1, wherein when an obstructing building is as tall as or taller than a predetermined height, the building/landmark image forming unit does not display the building, and the modified navigation route drawing unit displays the portion of the navigation route on or above the other obstructing buildings.

4. A navigation apparatus according to claim 1, wherein when the number of floors of an obstructing building is equal to or larger than a predetermined number of floors, the building/landmark image forming unit does not display the building, and the modified navigation route drawing unit displays the portion of the navigation route on or above the other obstructing buildings.

5. A navigation apparatus according to claim 1, further comprising:

a ratio of obstructed portion calculating unit for calculating the ratio of the portion of the navigation route obstructed by the buildings in a specific range of the navigation route, wherein when the ratio of the portion of the navigation route obstructed by the buildings is equal to or larger than a predetermined ratio, the modified navigation route drawing unit lifts the portion of the navigation route and displays it.

6. A navigation apparatus according to claim 1 further comprising:

an amount of navigation route displayed in lifted state calculation unit for calculating the height of the buildings which obstruct the portion of the navigation route and for calculating a height by adding a proper amount of height to the above calculated height as a lifting amount of the navigation route to be displayed, wherein the navigation route drawing unit comprises a modified navigation route drawing unit for displaying the portion of the navigation route by lifting it by the amount calculated by the amount of navigation route displayed in lifted state calculation unit.

7. A navigation route display method of a navigation apparatus comprising:

calculating a navigation route to a destination;

displaying buildings substantially opaquely and three-dimensionally on a map;

three-dimensionally displaying the navigation route on a road;

detecting a portion of the navigation route obstructed by the buildings; and lifting the obstructed portion of the navigation route on or above the buildings and displaying it.

8. A navigation route display method according to claim 7, further comprising:

subjecting the obstructing buildings to transparent or semi-transparent display processing so that the buildings can be distinguished from other buildings.

9. A navigation route display method according to claim 7, further comprising:

not displaying a building by which the portion of the navigation route is obstructed when the height of the building is as tall as or higher than a predetermined height, and displaying the navigation route on or above the other obstructing buildings.

10. A navigation route display method according to claim 7, further comprising:

not displaying a building by which the navigation route is obstructed when the number of floors of the building is equal to or larger than a predetermined number of floors, and displaying the navigation route on or above the other obstructing buildings.

11. A navigation route display method according to claim 7, further comprising:

calculating the ratio of the portion of the navigation route obstructed by the buildings in a specific range of the navigation route; and lifting the navigation route and displaying it when the ratio is equal to or larger than a predetermined ratio.

12. A navigation route display method according to claim 7, further comprising:

calculating the height of the buildings which obstruct the portion of the navigation route;

calculating a height by adding a proper amount of height to the above calculated height as a lifting amount of the navigation route to be displayed; and displaying the portion of the navigation route by lifting it by the lifting amount.

* * * * *